(12) United States Patent
Idan et al.

(10) Patent No.: US 7,577,246 B2
(45) Date of Patent: Aug. 18, 2009

(54) METHOD AND SYSTEM FOR AUTOMATIC QUALITY EVALUATION

(75) Inventors: Yizhak Idan, Herzeliya (IL); Moshe Wasserblat, Modiin (IL); Offer Hassidi, Kiryat-Ono (IL)

(73) Assignee: Nice Systems Ltd., Raanana (IL)

( * ) Notice: Subject to any disclaimer, the term of this patent is extended or adjusted under 35 U.S.C. 154(b) by 151 days.

(21) Appl. No.: 11/613,203

(22) Filed: Dec. 20, 2006

(65) Prior Publication Data

US 2008/0152122 A1   Jun. 26, 2008

(51) Int. Cl.
*H04M 3/00* (2006.01)
(52) U.S. Cl. .................. 379/265.01; 434/350; 709/219
(58) Field of Classification Search ............ 379/265.01; 434/350; 709/219
See application file for complete search history.

(56) References Cited

U.S. PATENT DOCUMENTS

| | | |
|---|---|---|
| 4,145,715 A | 3/1979 | Clever |
| 4,527,151 A | 7/1985 | Byrne |
| 5,051,827 A | 9/1991 | Fairhurst |
| 5,303,045 A | 4/1994 | Richards et al. |
| 5,307,170 A | 4/1994 | Itsumi et al. |
| 5,353,618 A | 10/1994 | Crick |
| 5,404,170 A | 4/1995 | Keating |
| 5,491,511 A | 2/1996 | Odle |
| 5,519,446 A | 5/1996 | Lee |
| 5,734,441 A | 3/1998 | Kondo et al. |
| 5,742,349 A | 4/1998 | Choi et al. |
| 5,751,346 A | 5/1998 | Dozier et al. |
| 5,790,096 A | 8/1998 | Hill, Jr. |
| 5,796,439 A | 8/1998 | Hewett et al. |
| 5,091,780 A | 12/1998 | Wixson et al. |
| 5,895,453 A | 4/1999 | Cook et al. |
| 5,920,338 A | 7/1999 | Katz |
| 6,014,647 A | 1/2000 | Nizzar et al. |
| 6,028,626 A | 2/2000 | Aviv et al. |
| 6,031,573 A | 2/2000 | MacCormack et al. |
| 6,037,991 A | 3/2000 | Thro et al. |
| 6,070,142 A | 5/2000 | McDonough et al. |

(Continued)

FOREIGN PATENT DOCUMENTS

WO   WO 95 29470 A   11/1995

(Continued)

OTHER PUBLICATIONS

NiceVision—Secure your Vision, a prospect by NICE Systems, Ltd., Dec. 20, 2006.

(Continued)

*Primary Examiner*—Quynh H Nguyen
(74) *Attorney, Agent, or Firm*—Ohlandt, Greeley, Ruggiero & Perle, L.L.P.

(57) ABSTRACT

A method and apparatus for automatic quality evaluation of an activity related to an organization, such as an agent of an organization which interacts with a calling party, a product, a campaign or the like, based on any combination of one or more of the following: the interaction itself and particularly its vocal part; meta data related to the call, to the call parties or to the environment; information extracted from the call or general information. The method may be activated off-line or on-line, in which case all alert can be generated for one or more calls.

42 Claims, 3 Drawing Sheets

U.S. PATENT DOCUMENTS

| | | | |
|---|---|---|---|
| 6,081,606 A | 6/2000 | Hansen et al. | |
| 6,092,197 A | 7/2000 | Coueignoux | |
| 6,094,227 A | 7/2000 | Guimier | |
| 6,111,610 A | 8/2000 | Faroudja | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,212,178 B1 | 4/2001 | Beck | |
| 6,230,197 B1 | 5/2001 | Beck et al. | |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,427,137 B2 | 7/2002 | Petrushin | |
| 6,459,787 B2 * | 10/2002 | McIllwaine et al. | 379/265.06 |
| 6,549,613 B1 | 4/2003 | Dikmen | |
| 6,570,608 B1 | 5/2003 | Tserng | |
| 6,604,108 B1 | 8/2003 | Nitahara | |
| 6,628,835 B1 | 9/2003 | Brill et al. | |
| 6,704,409 B1 | 3/2004 | Dilip et al. | |
| 7,023,979 B1 * | 4/2006 | Wu et al. | 379/265.11 |
| 7,076,427 B2 | 7/2006 | Scarano et al. | |
| 7,103,806 B1 | 9/2006 | Horvitz | |
| 7,464,326 B2 * | 12/2008 | Kawai et al. | 715/205 |
| 2001/0052081 A1 | 12/2001 | McKibben et al. | |
| 2002/0005898 A1 | 1/2002 | Kawada et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2003/0033145 A1 | 2/2003 | Petrushin | |
| 2003/0059016 A1 | 3/2003 | Lieberman et al. | |
| 2003/0163360 A1 | 8/2003 | Galvin | |
| 2004/0016113 A1 | 1/2004 | Elazar et al. | |
| 2004/0098295 A1 | 5/2004 | Sarlay et al. | |
| 2004/0141508 A1 | 7/2004 | Schoeneberger et al. | |
| 2004/0166484 A1 * | 8/2004 | Budke et al. | 434/433 |
| 2004/0249650 A1 | 12/2004 | Freedman et al. | |
| 2006/0093135 A1 | 5/2006 | Fiatal et al. | |
| 2008/0063178 A1 * | 3/2008 | Paden et al. | 379/265.06 |

FOREIGN PATENT DOCUMENTS

| | | |
|---|---|---|
| WO | WO 98 01838 A | 1/1998 |
| WO | WO 00/73996 | 12/2000 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |

OTHER PUBLICATIONS

Nice Systems announces New Aviation Security Initiative, reprinted from Security Technology & Design, Dec. 20, 2006.

(Hebrew) "the Camera That Never Sleeps" from Yediot Aharonot, Dec. 20, 2006.

Freedman, I. Closing the Contact Center Quality Loop with Customer Experience Management, Customer Interaction Solutions, vol. 19, No. 9, Mar. 2001.

PR Newswire, Nice Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

Sedor—Internet pages from http://www.dallmeier-electronic.com, Dec. 20, 2006.

(Hebrew) print from Haaretz, "The Computer at the Other End of the Line", Feb. 17, 2002.

article Sertainty—Automated Quality Monitoring—SER Solutions, Inc.—21680 Ridgetop Circle Dulles, VA—www.ser.com, Dec. 20, 2006.

article Sertainty—Agent Performance Optimization—2005 SE Solutions, Inc, Dec. 20, 2006.

Lawrence P. Mark SER—White Paper—Sertainty Quality Assurance—2003-2005 SER Solutions Inc., Dec. 20, 2006.

Robust Text Independent Speaker Identification Using Gaussian Mixture Speaker Models, Dec. 20, 2006.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?, Dec. 20, 2006.

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Towards an Automatic Classification Of Emotions In Speech—N. Amir. S. Ron, Dec. 20, 2006.

* cited by examiner

METHOD AND SYSTEM FOR AUTOMATIC QUALITY EVALUATION

BACKGROUND OF THE INVENTION

1. Field of the Invention

The present invention relates to quality evaluation in general, and more specifically to a method and system for automatic quality assessment of performance in an organization.

2. Discussion of the Related Art

Quality evaluation tools are intended for obtaining, recording or using productivity, quality or performance measures within an organization. Within organizations or organizations' units that mainly handle customer interactions, such as call centers, customer relations centers, trade floors or the like, a key factor is quality monitoring of various elements, such as the proficiency of personnel member interacting with calling parties, the impact of a campaign, the success of a product sale or a product, especially in relation to the competition, or the like. An agent interacting with a customer represents the organization to that customer, and is responsible for a significant part of the customer experience. A pleasant and professional agent can prove useful in customer service and customer retention as well as in influencing new customers to buy services or goods from the organization. On the other hand, agents are a resource of the organization, and as such their time should be managed as efficiently as possible. Thus, there is great importance in evaluating the agents' performance on a regular basis, for purposes such as identifying and correcting inefficiencies in an agent's conduct, rewarding agents for notable performance, or the like.

Traditionally, evaluations are done by an evaluator using an evaluation tool. In a typical call center service evaluation scenario, a supervisor listens to a randomly selected call of a specific agent, fills in an evaluation form, and attributes to the agent or to the call a quality score or other scores and indications. During employee evaluation processes or if significant deficiencies are detected in the agent's performance, the supervisor may talk to the agent, suggest a training session or take other measures. The scores assigned to a call may be taken into account when evaluating or analyzing a campaign, a product, a product line or the like.

The traditional evaluation scheme described above has multiple deficiencies. First, the evaluation capacity is relatively low due to the dependence of the evaluation process on the human evaluator. Next, the scope of the evaluation may be limited due to the range of factors that can be taken into account when evaluating an interaction, including the captured interaction itself the agent's workload, the call center workload during the interaction time and its impact on the service quality (e.g. queue time before agent availability), the history of interactions between the agent and the specific customer, the contribution of other agents to an activity involving several agents, the details and behavior profile of the specific customer and the like. Human evaluators may not be aware or capable of considering such factors which may be relevant to the interaction quality and its evaluation. Another limitation is that the overall evaluation may be biased due to the relatively small number of the interactions that can be evaluated using current techniques and methodologies. Thus, the evaluator typically samples a fraction of the interactions made by all agent as a basis for the evaluation, which may be non-representing and may not indicate important issues. Yet another problem is that there is no mechanism that can identify evaluation-worthy interactions and prioritize the interactions for evaluation. In addition, the evaluation may be subjective and biased due to the dependence on the specific agent and evaluator involved, and possibly their relationship. Moreover, the evaluator may not be aware of this bias. Also, the evaluation is executed post activity and by another person. Thus, factors that can influence the quality of the interaction (e.g. a customer has waited a long time on queue before the activity) may be unknown to the evaluator at the time of evaluation. Yet another problem is that evaluations are based on evaluating the activity itself and do not incorporate external factors such as the customer's satisfaction, as part of the quality evaluation. Moreover, no use or little use is done in parameters that can be drawn from the interactions and can be used for calibrating business processes and policies (e.g. the relation between the interaction's quality and its duration, or the relation between queue time before the interaction and the customer satisfaction when available). Evaluations can be further used for other agent related activities, such as recruitment (e.g. what is the predicted quality of a candidate agent, based on his background and skills profile), promotion and compensation (i.e. the objective quality of the agent) and retention (the relation between the agent's quality trend and the agent's probability to leave). When employing quality monitoring, it is desired that outstanding interactions are notified to a supervisor, or another person within the organization. It is also desired that real-time or near-real-time alert is generated for such interactions, or agent quality trend where there might be room for effective reparative intervention.

These is therefore a need in the art for a system and apparatus for automated quality monitoring, which will overcome the problems and disadvantages of prior art systems and of manual evaluation methods. The solution should provide more characteristics, take into account more factors, and make the evaluation results available to additional tools and systems intended for improving the performance of the organization or parts thereof.

SUMMARY OF THE PRESENT INVENTION

It is an object of the present invention to provide a novel method for detecting evaluating interactions and more particularly vocal interactions in an organizations, which overcomes the disadvantages of the prior art. In accordance with the present invention, there is thus provided a method for automated performance evaluation of a current interaction between a calling party and a personnel member of an organization, the method comprising: a training and calibration step for obtaining one or more rules for determining one or more scores for a historic interaction, said ruled depending on one or more features; a feature evaluation step for determining a value of each feature, in association with the current interaction; and a score determination step for integrating the valued into one or more score evaluations for the current interaction, using the rules. The method can further comprise a goal determination step for associating one or more labels to one or more goals associated with the current interaction. The current interaction optionally comprises a vocal component. The training step optionally comprises receiving the features and the rules. The training step optionally comprises: receiving one or more historic interactions; receiving one or more labels for one or more goals for each of the historic interactions; and determining the one or more rules. The method can further comprise a step of receiving the features or a step of deducing the features. Within the method, determining the rules is optionally performed using any one or more of the group consisting of: artificial intelligence, fizzy logic, data mining, statistics, pattern recognition, classification, or machine learning. The method optionally comprises a step of visualizing the scores or the goals. Within the method, deducing the features is optionally performed using any one or more of the group consisting of: artificial intelligence, fuzzy logic, data mining, statistics, pattern recognition, classification, or machine learning. The method optionally comprises a partial score determination step for determining according to a second rule one or more partial scores for the current interaction, the partial score associated with the one or more features. The method can further comprise a step of storing the partial scores or visualizing the partial scores. Within the method, the one or more features can be taken from the group consisting of: a word spotted in the interaction, an emotional level detected in the interaction, talk over percentage, number of bursts in the interaction, percentage of silence, number of participants in the interaction, number of transfers in the interaction, hold time in the interaction, abandon from hold time in the interaction, hang-up side of the interaction, abandon from queue time in the interaction, start and end time of the interaction, agent time in the interaction, customer time in the interaction, ring time in the interaction, call wrap up time of the interaction; personnel member name, personnel member status, personnel member hire date, personnel member grade, personnel member skills, personnel member department, personnel member location, personnel member working hours, personnel member workload, personnel member previous evaluations, a screen event on a computing platform operated by the personnel member, information from Customer Relationship Management system, information from billing system, or information relating to the customer. The method optionally comprises a step of capturing the interactions or a step of capturing additional information. The additional information optionally relates to any of the group consisting of: the interactions; the personnel member; the calling party; the organization, or a part of the organization. The method optionally comprises a step of indicating the current interaction to an evaluator, or a step of performing further analysis related to the current interaction, or to the goal. Each of the one or more scores may be related to the personnel member, to a product associated with the organization, or to a campaign associated with the organization.

Another aspect of the disclosed invention relates to an apparatus for automatically evaluating one or more interactions between a calling party and a personnel member of an organization, the apparatus comprising: a training component for obtaining one or more features and one or more rules for evaluating the interactions; and an automated quality monitoring component for obtaining one or more scores for the current interactions, using the rules. The apparatus can further comprise a component for capturing the interactions or for capturing additional data. Optionally, the apparatus comprises an alert generation component for generating an alert when the score exceeds a predetermined threshold. The apparatus can further comprise a storage device for storing the interactions or the additional data. The apparatus optionally comprises a partial score determination component for determining according to a second rule a partial score for the current interaction, the partial score associated with the feature. The apparatus can further comprise an alert generation component for generating an alert when the partial score exceeds a predetermined threshold.

Yet another aspect of the disclosed invention relates to a computer readable storage medium containing a set of instructions for a general purpose computer, the set of instructions comprising: a training step for obtaining an at least one rule for determining an at least one score for an at least one historic interaction, said rule depending on one or more features; a feature evaluation step for determining one or more values of the feature, in association with the current interactions; and a score determination step for integrating the values into the score for the current interaction, using the rules.

Yet another aspect of the disclosed invention relates to a method for performance evaluation of an interaction between a calling part and a personnel Member of an organization, the method comprising: reviewing the interaction; receiving one or more data items related to the interaction; and evaluating the interaction using the data items.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention overcomes the disadvantages of the prior art by providing a novel method and a system for automatic quality assessment of activities within an organization, such as agents or other personnel members interacting with customers in call centers or contact centers, the effectiveness of a campaign, the satisfaction level from a product, or the like. In accordance with the present invention, a performance evaluation system is provided that substantially eliminates or reduces disadvantages or problems associated with the previously developed systems and processes. The present invention evaluates one or more partial scores, total scores, or goals for an interaction, and assigns one or more labels to the interaction, wherein the scores, goals, labels are based on features, formulas, or rules for combining the features. A partial score generally relates to one value associated with a feature regarding an interaction, and a total score generally refers to a combination of feature values combined into a result associated with the interaction. A goal generally refers to a broader point of view of an interaction, wherein a feature generally refers to a specific aspect. A goal, unlike a total score, is optionally named. Thus, a goal may refer to a "politeness", "customer satisfaclion", or the like, while a feature may be "emotion level", the partial score may be the actual emotion level assigned to a specific interaction, and a total score is a combination of one or more feature values associated with an interaction. A label is generally the result assigned to a certain goal in association with a specific interaction, for example "a polite interaction", "a dissatisfied customer ilteraction" or the like. The features and rules are deduced by training the system on interactions and user-supplied evaluations for the historic interactions. Alternatively, all or part of the features and the rules can be set manually by a user. A user in this case can be an evaluator, such as a supervisor or a manager, or a person whose task is to introduce the information into the system. Such person can be an employee of the organization or belong to a third party organization responsible for integrating such system within the organization. In particular, the present invention provides a performance evaluation system that extracts and evaluates one or more measures or features from an interaction and/or from data and metadata related to the interaction or to a personnel member such as an agent involved in the interaction, and automatically creates total evaluation score by considering the evaluated measures. The features to be evaluated may include metadata related to the call, such as time of day, contact origin, IVR category selected by the calling party, duration, the calling party's hold time, number of call transfers during the interaction or the like; the type of contact media used during the interaction (e.g. voice, video, chat, etc.); data extracted from the interaction itself such as spotted words, emotion levels, or the like; and additional data, such as data related to the shifts of the agent handling the call; data related to the calling person or the like. The invention optionally extracts from previous interactions and evaluations the features to be extracted and evaluated, and the combination thereof for generating partial and total evaluation score, thus making the system independent of human definition of the features to be evaluated, the evaluation for different results associated with the features, and the way to integrate all results of all features into a total interaction evaluation score or any other measure. In a preferred embodiment, interactions with one or more notable measures or a notable total evaluation score are notified to a human evaluator or a relevant system, preferably in real-time or near-real-time, i.e. during the interaction or a short time, in the order of magnitude of minutes, after an interaction ends. For example, it may be desired to use a real-time partial or total score for directing the person to a survey system, or to use a bad call indication to navigate the calling person differently the next time he calls (the time of which is unknown, so the indication should be available as soon as possible).

Figure 1:
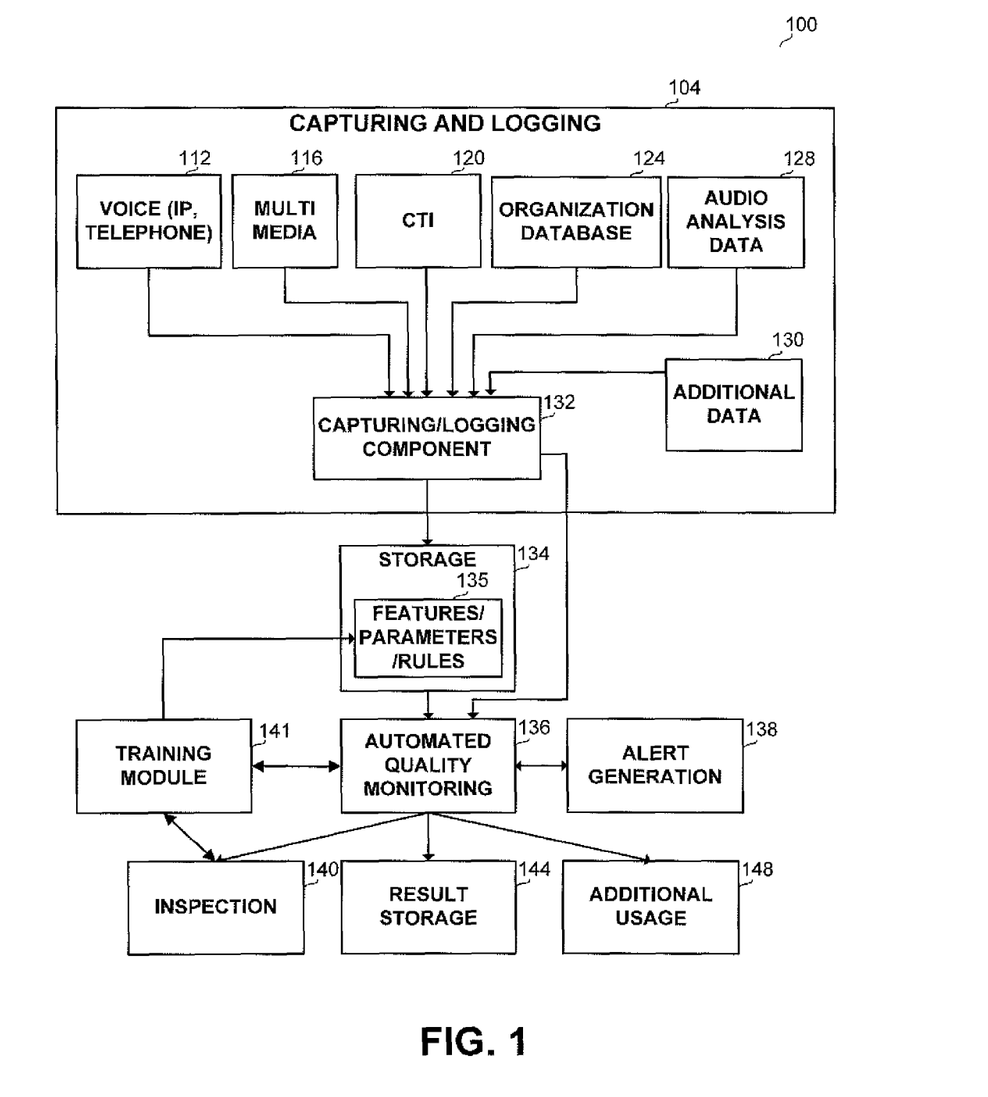
FIG. 1 is a block diagram of the main components in a typical environment in which the disclosed invention is used.

Referring now to FIG. 1, which presents a block diagram of the main components in a typical environment in which the disclosed invention is used. The environment, generally referenced as 100, is an interaction-rich organization, typically a financial institute such as a bank, a trading floor, or an insurance company, a public safety contact center, a communications service provider contact center, customer service outsourcing center or the like. Interactions with customers, users, leads, employees, business partners, or other contacts are captured, thus generating input information of various types. Each organization may comprise one or more sites, i.e. geographic locations in which interactions are handled. The information types include vocal interactions, interactions comprising a vocal component non-vocal interactions, organizational data and additional data. Interactions comprising a vocal component optionally include telephone calls 112, made using any device, such as a landline phone or a cellular phone, and transmitted using any technology, such as analog lines, voice over IP (VoIP) or others. The capturing of voice interactions can employ many forms and technologies, including trunk side, extension side, summed audio, separate audio, various encoding and decoding protocols such as G729, G726, G723.1, and the like. The voice typically passes through a PABX (not shown), which in addition to the voice of the two or more sides participating in the interaction, collects is additional information discussed below. The interactions can further include face-to-face interactions, such as those recorded in a walk-in-center, and additional sources of vocal data, such as microphone, intercom, the audio part of a video capturing such as a video conference, vocal input by external systems or any other source. Another source of collected information includes multi media information 116, which comprises interactions or parts thereof, such as video conferences, e-mails, chats, screen events including text entered by the agent, buttons pressed, field value change, mouse clicks, windows opened or closed, links to additional interactions in which one of the participants in the current interaction participated, or any other information relevant to the interaction or to the participants, which may reside within other applications or databases. In addition, the environment receives Computer Telephony Integration (CTI) and PABX information 120, including start and end time, ring time, hold time, queue time, call wrap up time, number of participants, stages (i.e. segments of the call during which the speakers do not change), hold time, abandon from hold, hang-up side, abandon from queue, number and length of hold periods, transfer events, number called, number called from, DNIS, VDN, ANI, or the like. Yet another source of information is organization information 124, containing information such as customer feedback and partial or total scores collected for example via a customer survey taken after an interaction; agent information such as name, status such as temporary or not, hire date, grade, grade date, job function, job skills, training received, department, location, agent working parameters related to the interaction such as working hours and breaks during the shift, workload, quality of recent interactions, previous agent and evaluator partial or total scores and trends, average monthly agent evaluations, agent trend during the last predetermined period, service attrition indication, agent shift assignments, or the like. Organization information 124 can further include relevant information from other systems such as Customer Relationship Management (CRM), billing, Workflow Management (WFM), the corporate Intranet, mail servers, the Internet, relevant information exchanged between the parties before, during or after the interaction, details of the shift the agent worked on that day, the agent's experience, information about previous evaluations of the same agent, documents and the like. Yet another source of information relates to audio analysis information, i.e. results of processing vocal segments such as telephone interactions. The results can include speech-to-text, words extracted from the interaction and their timing within the interaction, for example greetings, bad words, satisfaction or dissatisfaction, fulfillment, or others; talk-over percentage, number of bursts and identification of bursting side, percentage of silence, percentage of agent/customer speech time, excitement and emotions on both sides. Additional information 130 can also be introduced into the system for evaluation processes, including for example video analysis of video streams, or capturing of the participants' screen images. Data from all the above-mentioned sources and others is captured and preferably logged by capturing/logging unit 132. Capturing/logging unit 132 comprises a computing platform running one or more computer applications as is detailed below. The captured data is optionally stored in storage 134, which is preferably a mass storage device, for example an optical storage device such as a CD, a DVD, or a laser disk; a magnetic storage device such as a tape or a hard disk; a semiconductor storage device such as Flash device, memory stick, or the like. The storage can be common or separate for different types of captured interactions and different types of additional data. Alternatively, the storage can be remote from the site of capturing and can serve one or more sites of a multi-site organization. Storage 134 further optionally stores features, parameters and rules 135, describing the features or measures to be extracted or evaluated from an interaction, such as spotted words, length of conversation, number of transfers, customer's satisfaction, or others, and the way to combine them into one or more total evaluation scores, or to goals (by assigning labels), referring for examples to customer satisfaction, compliance with instructions, or similar goals. Labels, however, may alternatively be unrelated to goals, such as "for follow-up", "reconsider" or the like. Each goal may be associated with a different business need, such as agent evaluation, customer retention or others. The rules can be for example a weighted sum, logical or algebraic calculation or a mixture thereof, multiplication or other linear and/or non linear functions connecting the partial scores assigned to features in connection with a certain interaction, and one or more labels assigned to goals in association with the interaction. Features, parameters, rules or labels 135 are either entered by a user such as an evaluator or determined by training module 141. Training module 141 preferably receives historic interactions, evaluations, and/or feedback thereof, and deduces features, parameters, rules, or labels 135. Training module 141 can also extract features or statistical behavior that do not require human evaluation, such as the average and variance of call duration, and provide this information to automated quality monitoring 136 or other systems. Such information can be used for business insight or for determining out-of-norm behavior that can be used as a basis for setting a partial or total score, evaluation prioritizing, alerting, or the like. The data, features, parameters, or rules are transferred from storage 134 or directly from capturing/logging unit 132 without being stored, to automated quality monitoring component 136 which executes the actual evaluation method, detailed in association with FIG. 2 and FIG. 3 below, and obtains one or more partial scores for the interaction, each partial score associated with one or more features, and a total score for the interaction. If one of the partial scores or the total score or their trend exceeds a predetermined threshold, or meets other criteria, such as belonging to the top/bottom predetermined percentage, or is more/less than a predetermined times an average partial or total score, or provides certain information a command may be sent to alert generation component 138. The alert can take any form, such as transferring a call, providing an on-screen alert, sending an e-mail, fax, SMS, telephone message or others to a person in charge, updating a database or other actions. The person in charge preferably receives also the interaction or the relevant data. If the alert is a real-time alert, a live connection for monitoring or for intervening in the call as long as it is continued is preferably sent to the person in charge, so that he or she can listen and take part in the call and. If the alert is sent when the call was already finished, the call recording or a link to its recording thereof may be sent to the person. In a preferred embodiment, the evaluation results are optionally transferred to inspection component 140, where a human evaluator in inspector preferably monitors the performance of automated quality monitoring component 136. Optionally, input from the human inspection is fed back into training module 141 for updating rules and parameters 135. Alternatively, the evaluation information is transferred for storage purposes to result storage 144. In addition, the evaluation information can be transferred for any other purpose or component 148 such as reporting, storage in a human resources (HR) system, reward calculation, as a feedback to the agent himself, as a call assignment parameter in Automatic Call Distribution (ACD) systems or other systems and purposes, input to service, marketing, or product departments, or the like. For example, there might be a need to escalate an incoming call even before it was handled, such as when a customer whose last interaction with the organization was unsatisfactory due to the agent treatment might be directed to one of the agents handling VIP customers or to a specialist in customer retention. All components of the system, including capturing/logging components 132, automated quality monitoring component 136 and training module 141, preferably comprise one or more computing platforms, such as a personal computer, a mainframe computer, or any other type of computing platform that is provisioned with a memory device (not shown), a Central Processing Unit (CPU) or microprocessor device, and several I/O ports (not shown). Alternatively, each component can be a Digital Signal Processing (DSP) chip, an Application Specific Integrated Circuit (ASIC) device storing the commands and data necessary to execute the methods of the present invention, or the like. Each component can further include a storage device (not shown), storing the relevant applications and data required for processing. Each computing platform runs one or more applications, including the applications running on the capturing components, training component or the quality evaluation component are a set of logically inter-related computer programs, modules, or other units and associated data structures that interact to perform one or more specific tasks. All applications can be co-located and run on the same one or more computing platform, or on different platforms. In yet another alternative, the information sources, capturing platforms, computing platforms, the or storage devices, or any combination thereof can be located on or in association with one or more sites of a multi-site organization, and one or more evaluation components can be remotely located, evaluate interactions captured at one or more sites and store the segmentation results in a local, central, distributed or any other storage. It will be appreciated that information stored in storage 134 can be utilized for monitoring prior to or simultaneously with the storage operation, such that the captured information is streamed to automated quality monitoring component 136, and evaluation results are available in real-time or near-real-time to the agent, to a supervisor, to a manager, or another person when immediate intervention is required. It will be apparent to a person of ordinary skill in the art that the various data sources and applications used in the evaluation may be divided in a different way. For example audio analysis data 128 may be categorized under additional data 128, but may also be a product generated by automated quality monitoring component 136, and produced during its activity. The disclosed description is meant to provide one preferred embodiment, wherein other preferred embodiments can be designed without departing from the spirit of the disclosed invention.

Figure 2:
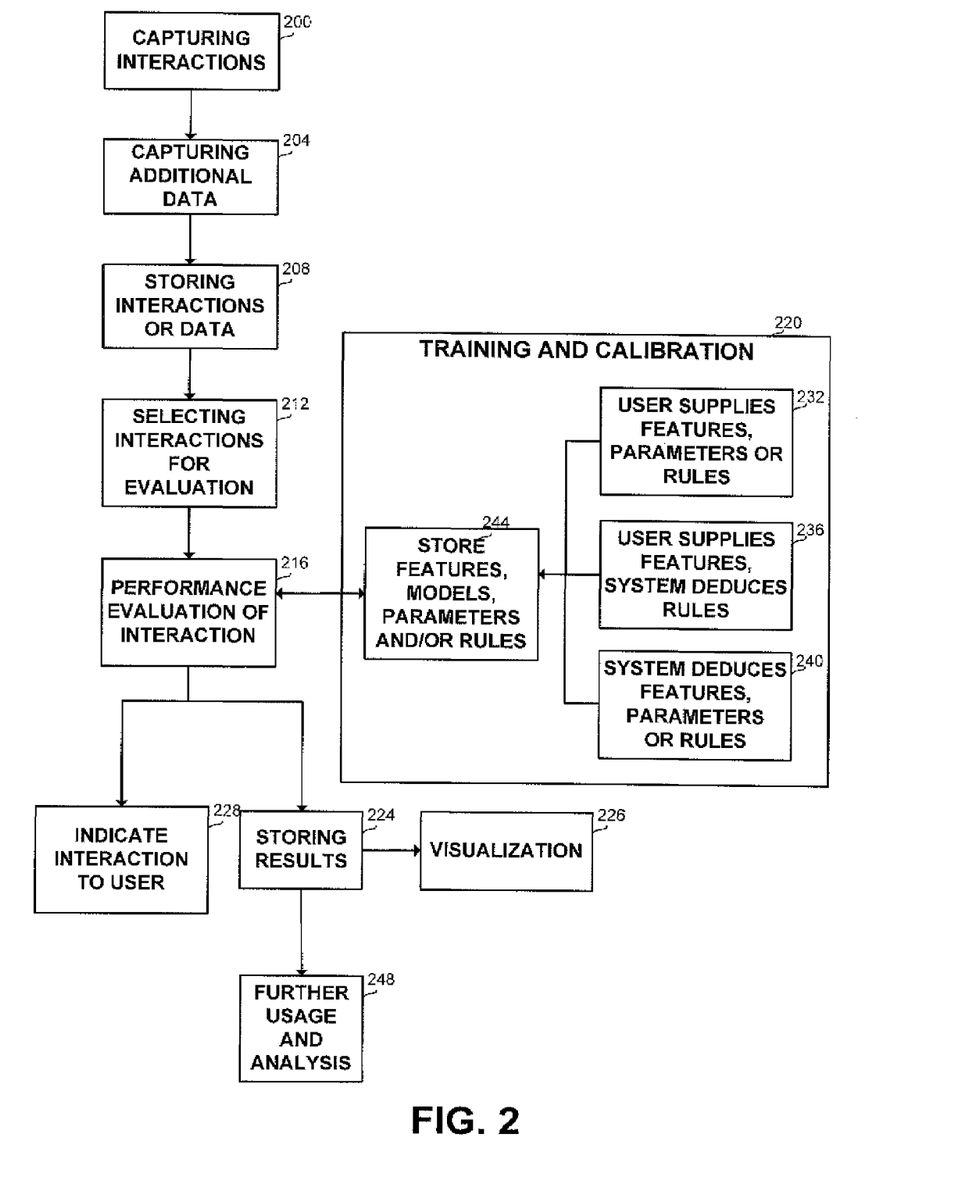
FIG. 2 is a flowchart of the automatic quality evaluation method, in accordance with a preferred embodiment of the disclosed invention.

Referring now to FIG. 2, showing a flow chart of the main steps associated with the method of the disclosed invention. The process starts at capturing interactions step 200, during which interactions, including but not limited to vocal interactions, are captured. The vocal interactions comprise interactions made from or to any type of communication device, including landline, mobile, cellular, or personal computing device, or other types of vocal interactions, such as the audio part of video capturing, a capturing of interactions in walk-in centers or the like. At step 204 additional information is captured, including CTI information, multi-media information, and data from organizational databases. It will be appreciated by a person skilled in the art that step 200 and step 204 can be performed simultaneously or one after the other, at any order, and step 200 is not necessarily performed before step 204. Optionally, analysis engines such as word spotting, emotion detection and others are operated on one or more interactions at step 204, and supply indications related to the interactions. At storing interactions or data step 208 the interactions captured at step 200 and/or the data captured at step 204 are optionally stored for later examination. This step may be omitted if further analysis related to performance is performed online and not upon stored data. At optional step 212, interactions to be evaluated are selected. If processing power is not limited, it would be desirable to evaluate all interactions, so all interactions are processed and recommendations are issued to a user for focusing on important interactions or groups of interactions. However, if this is not possible, a selection step is performed at step 212 for selecting interactions according to criteria. The criteria call be related to the agent, to the interaction, to the product, to a campaign, to the environment or to the processing capacity of the computing platforms. Thus, typical selection rules can be, for example: at least one interaction associated with each agent should be evaluated every predetermined period of time, for example a month; alternatively, an agent should be evaluated every week, for example, during his first month and only then every month; an evaluated interaction should have a minimal and/or a maximal duration, in order to avoid insignificant interactions on one hand, and too long and processing-power-consuming interactions on the other hand; in case of back-log, a newer interaction should be prioritized for evaluation over older one; interactions related to a predetermined department within an organization should take precedence over interactions related to other departments, or the like. The criteria may also relate to factors found by the analysis engines discussed in association with step 204 above. Thus, the analysis engines may be operated as part of the selection step 212 rather than during data capturing step 204. At step 216, one or more interactions selected at step 212 are evaluated. The interactions are evaluated using the interaction itself, together with relevant additional information, including for example: details about the agent, such as the shift he or she were working on the day of the interaction, their experience, previous scoring or the like; information about previous interactions of the same customer, and other information. The evaluation is done according to features, parameters and rules gathered through training process 220 detailed below. The training process outputs elements including features, parameters, statistics, or rules according to which an interaction should be evaluated. The features preferably relate to aspects of the interaction that should be considered, including for example: call duration, hold time, spotted compliance words, such as "good morning, company X, this is Y speaking, how may I help you", "thank you for calling company X", etc., spotted words that indicate anger, emotion level of the different parties, number of bursts of parties into the other's patty speech, crosstalk duration, number of transfers, or the like. The features to be examined optionally depend on the objective of the evaluation, such as: evaluating an agent, a campaign, a product or any other factor within the organization. The features may thus include characteristics of the agent, the call, the environment or other factors. The parameters include for example the specific words to be spotted, the emotion level and emotion type that provide required indication, or the like. The characteristics used may change according to other characteristics, for example, when an indication for a satisfied customer is available for the call, testing the emotion levels may bc skipped, and higher importance may be assigned to other characteristics, such as spotted compliance words. The rules preferably relate to the partial scoring that should be assigned to the results of applying each feature to the interaction, for example: if at least a predetermined percentage, such as 80% of the required compliance words are spotted with high certainty in an interaction, then the interaction receives the maximal scoring for this aspect. The rules may be static or dynamic. A static rule for example would assign a fixed partial score to an emotional level. A dynamic rule may take into account the department the agent is working for and assign a differential partial score to the emotional level, depending on the service type provided by the department, the average emotion levels of all calls or workload on the day of the interaction. Another rule preferably refers to assigning one or more goals or labels to the interaction, optionally based on the partial scores of the various features. Each of the total scores should preferably combine partial scores assigned to different features. For example, a total score can comprise a weighted sum of the partial scores assigned to spotted compliance words, emotional level above a certain threshold, and a maximal number of bursts, wherein a label assigned to such a call may be "an emotional interaction", or a similar name. The rule for assigning a label or a total score may also be dynamic or static. For example, a dynamic rule may take into account the experience of an agent, and assign better total scores to a less experienced agent, wherein a more experienced agent would receive an inferior total score for the same performance. In another example, interactions with a customer who called more than a predetermined number of times recently, may justify a better total score.

Figure 3:
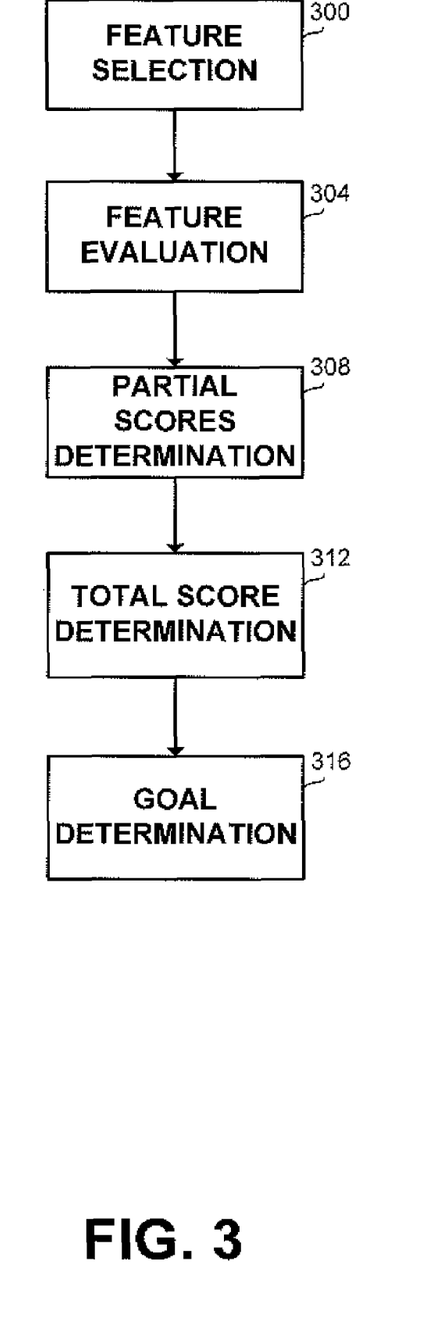
FIG. 3 is a flowchart of the evaluation process itself, in accordance with a preferred embodiment of the disclosed invention.

Referring now to FIG. 3, showing a flow chart of the main steps associated with performance evaluation step 216 of FIG. 2. At feature selection step 300, the relevant features are selected for the interaction to be evaluated. The features may be selected based on factors such as: the quality of the capturing, as some features, for example emotion detection, are more sensitive to the voice quality; computational complexity of features; automatic feature selection; the significance of the specific interaction, or others. Once the features for the specific interaction, as selected by a user in steps 232 or 236, or by the system in step 240 are determined, at feature evaluation step 304 the values of the features are determined. This may include performing analyses such as word spotting, emotion detection, call flow analysis, or usage of already available data such as number of transfers or hold time. At optional step 308, a partial score is optionally assigned to the value associated with each feature, based on rules determined during training and calibration steps 220 of FIG. 2, and at step 312 one or more total scores are assigned to the interaction, possibly through integration of the partial scores obtained at step 308, and using relevant combination rules, also obtained by training and calibration steps 220 of FIG. 2. In a preferred embodiment, analysis engines such as word spotting, emotion detection and others are operated during step 216 and supply indications for the relevant evaluated features. Alternatively, they are operated during step 308. Step 312 can be carried out without partial score determination step 308, if the goal determination is based on raw parameters, such as number of transfers, call length above a predetermined threshold or the like. At optional step 316, one or more labels are assigned to the interaction, as an evaluation of one or more goals. The labels are preferably based on the partial scores or on the total scores assigned to the interaction at step 312.

Referring now back to FIG. 2, at step 224 the evaluation results, including the partial and total scores, are stored for later retrieval, for example during future evaluation of the same agent, evaluations of other agents, statistics or any other purpose. At step 226 the results are optionally visualized, using any visualization tool or methodology, such as graphs, tables, connection networks, reports, or the like. At step 248, such further analysis or another usage is performed. Once a substantial amount of interactions are evaluated, their results have statistical significance, and they can be used for deducing organizational parameters such as quality drivers for agents, abnormal behavior of agents, reasons for inefficient service, such as too long interactions, or the like. Tools including data mining and various statistical analyses can be used for designing predictive scoring models, discovering behavior patterns, discovering behavior trends and exceptions relevant for the organization. At step 228, one or more interactions are transferred to a supervisor, a compliance officer or any other user, including a person or a system for further evaluation. Such interactions are preferably interactions for which one or more partial scores or a total score is exceptionally good or bad. For example, an exceptionally "bad" call, i.e. a call that received a total score significantly under the average can be sent to the agent itself, to enable self learning. Thus, it would be desired to indicate an interaction with a high emotional level to a supervisor or a manager, especially when the evaluation is performed in real-time or in near-real-time, i.e. the vocal stream or a link or reference thereto, and relevant information is transferred for evaluation or intervention during or shortly after the interaction ended. At that time, intervention in the situation might still be possible and improvement chances of may be higher than later on. In another preferred embodiment, interactions are evaluated and indicated to a supervisor on a periodical basis. In yet another alternative, interactions that receive a total score that is close to the average of the total scores of an agent are transferred to a supervisor for periodical evaluation. In yet another preferred embodiment, a supervisor or another user may indicate parameters for an interaction to be transferred to him. For example, if an evaluator indicated in a previous evaluation to an agent to be more polite, he may indicate that he prefers to receive calls related to the same agent, for which a partial score related to politeness is lower than the average.

Referring now to training steps 220, at step 232 the system receives from a user the features, such as word spotting, emotional level, work load, agent experience or the like, to be considered in the evaluation. The features may relate to the call itself to metadata thereof, to data extracted from the call, to the agent or the customer participating in the call, to the environment, or to the organization. The user optionally further supplies the parameters relevant for each feature, such as words to be spotted, and the rules, for example the partial score associated with a predetermined range of emotional level. The user also has to supply the rule for determining one or more total scores for an interaction. Further, the user may supply one or more rules for assigning one or more labels to the interaction, for example a customer satisfaction goal may be associated with an average of the partial score assigned for spotted words, emotional level and number of bursts. Step 236 is an alternative to step 232. In step 236, the user indicates for a multiplicity of historic interactions the features and the parameters according to which a feature is to be evaluated within an interaction, such as the emotional level, number of bursts, etc., and the way to determine the partial score, for example the maximal acceptable range of emotional level in a interaction. The user then evaluates, i.e. provides labels for multiple interactions and assigns one or more total scores to each exemplary interaction. The system then evaluates the partial scores for the interaction, and determines according to the partial scores and the total scores provided by the user, the rules according to which the partial scores are to be composed to goals. Alternatively, the training phase is also used for training a sub-system, such as the emotion analysis sub system, and the user also supplies the partial scores assigned to features of the exemplary interactions or some of them, to make the system more robust. In yet another alternative, at step 240, the user supplies only the labels for the training interactions or the total scores, and the system deduces the used features, parameters and rules. The features that should be considered for the goals may be determined by feature selection, through identification which features are more dominant in the goal calculation. The features and rules may be determined based on techniques such as artificial intelligence, fuzzy logic, data mining, statistics, pattern recognition, classification, machine learning, or others. In yet another alternative, the system may omit the use of all evaluator, and use a customer feedback available for the interaction as a proxy to an evaluator-provided total score.

Alternative steps 232, 236, and 240 differ in the workload division between the user training the system, and the system itself in determining the relevant features, parameters and rules. The more details provided by a user the more time consuming is the process. People skilled in the art will appreciate that other divisions of work between the user and the system may be implemented. For example, a user can provide accurate parameters and scoring rules for some features, such as compliance words which must be pronounced and less accurate details for other features, such as silence within the interaction. For the less specific details, the system will complete the deficiencies. The determination of partial scores and rules can employ methods and techniques known in the fields of artificial intelligence, fuzzy logic, data mining, statistics, pattern recognition, classification, machine learning and others. At step 244 the features, parameters, rules and other related data such as statistical models, users' voice models or other information are stored for later retrieval during evaluations at step 216.

As an optional addition, the system may record the values assigned by different evaluators to partial scores or to labels assigned to goals, and compare them. Thus, the system can notify about evaluators who typically assign total scores significantly higher or lower than the average. In yet another embodiment, the evaluator performing the evaluation is provided with interactions that were earlier classified by assigning total scores or labels by the system or by another evaluator. The interactions are preferably mixed, so that interactions representing a wide range of labels are presented to the evaluator, preferably without the assigned partial or total scores. This provides for a more typical division of partial or total scores, and more accurate rules. Training and calibration steps can be performed not only for initial training of the system, but also at a later time, for fine-tuning or calibration of the system.

The disclosed invention overcomes the problems of manual evaluations, and provides significant advantages: the capacity of quality monitoring increases, and when sufficient computing power is available, total QM (quality monitoring) can be achieved, in which all interactions are evaluated; due to the increased number of evaluated interactions, the overall quality measurement accuracy will increase, too; quality drivers can be identified on one hand, and abnormal behavior of agents can be detected on the other hand; calls can be profiled in an efficient manner; quality measurements can be fine-tuned while avoiding human and statistical bias; the interactions are evaluates using common evaluation methods, which are objective and not biased by a specific evaluator; critical measures for business performance monitoring can be determined, such as acceptable waiting times in incoming queue; performance quality may be increased while service and quality management costs are decreased; and it is possible to obtain real time indication for problematic interactions.

It should be appreciated that other methods, which may include one or more of the suggested steps, may be designed to suitably perform the concepts of the present invention in other similar manners. Such alternative methods and modes are also covered by the present invention.

It should further be appreciated that a human evaluator can perform the evaluation according to the organization's methodology and procedures, while receiving information from analysis engines, such as indication to spotted words, areas of high emotional level or the like. Such information may save the evaluator time in listening to the whole interaction and direct him or her to relevant areas. Thus, the evaluator will review the interaction, receive the additional interaction and provide an evaluation for the interaction based on the interaction itself or the auxiliary data.

It will be appreciated by persons skilled in the art that the present invention is not limited to what has been particularly show and described hereinabove. Rather the scope of the present invention is defined only by the claims which follow.

The invention claimed is:

1. A method for automated performance evaluation by a system of an at least one current interaction between a calling party and a personnel member of an organization based on at least one historic interaction, the method comprising:
receiving the at least one historic interaction and the at least one current interaction as captured by at least on capturing or logging component associated with the organization;
automatically training the automated performance evaluation system using the at least one historic interaction to determine how to evaluate future interactions and a label associated with the at least one historic interaction, for obtaining at least one rule for determining at least one total score for the at least one historic interaction, said training comprising deducing at least one feature in association with the at least one historic interaction; said at least one rule depending upon said at least one feature;
automatically evaluating at least one value of the at least one feature, in association with the at least one current interaction; and
determining a total score for the at least one current interaction, by integrating the at least one value, using the at least one ruler,
wherein the at least one value of the at least one feature is retrieved from an audio part of the at least one current interaction.

2. The method of claim 1 further comprising a goal determination step for associating an at least one label to an at least one goal associated with the current interaction.

3. The method of claim 1 wherein the at least one current interaction comprises a vocal component.

4. The method of claim 1 wherein the training step comprises receiving the at least one feature and the at least one rule.

5. The method of claim 1 wherein the training step comprises:
receiving an at least one historic interaction;
receiving an at least one label for an at least one goal for each of the at least one historic interaction; and
determining the at least one rule.

6. The method of claim 5 further comprising a step of receiving the at least one feature.

7. The method of claim 5 further comprising a step of deducing the at least one feature.

8. The method of claim 5 wherein determining the at least one rule is performed using any one or more of the group consisting of: artificial intelligence, fuzzy logic, data mining, statistics, pattern recognition, classification, or machine learning.

9. The method of claim 1 further comprising a step of visualizing the at least one total score.

10. The method of claim 1 further comprising a step of visualizing the at least one goal.

11. The method of claim 7 wherein deducing the at least one feature is performed using any one or more of the group consisting of: artificial intelligence, fuzzy logic, data mining, statistics, pattern recognition, classification, or machine learning.

12. The method of claim 1 further comprising a partial score determination step for determining according to an at least one second rule an at least one partial score for the at least one current interaction, the at least one partial score associated with the at least one feature.

13. The method of claim 12 further comprising the step of storing the at least one partial score.

14. The method of claim 12 further comprising a step of visualizing the at least one partial score.

15. The method of claim 1 wherein the at least one feature is taken from the group consisting of: an at least one word spotted in the at least one interaction, an emotion level detected in the at least one interaction, talk over percentage, number of bursts in the at least one interaction, percentage of silence, number of participants in the at least one interaction, number of transfers in the at least one interaction, number of holds in the at least one interaction, hold time in the at least one interaction, abandon from hold time in the at least one interaction, hang-up side of the at least one interaction, abandon from queue time in the at least one interaction, start and end time of the at least one interaction, agent time in the at least one interaction, customer time in the at least one interaction, ring time in the at least one interaction, call wrap up time of the at least one interaction; personnel member identification, personnel member status personnel member hire date, personnel member grade, personnel member skills, personnel member department, personnel member location, personnel member working hours, personnel member workload, personnel member previous evaluations, an at least one screen event on a computing platform operated by the personnel member, information from workflow management system, information from customer relationship management system, information from billing system, or any other information relating to the customer.

16. The method of claim 1 further comprising a step of capturing the at least one interaction.

17. The method of claim 1 further comprising a step of capturing additional information.

18. The method of claim 17 wherein the additional information relates to any of the group consisting of: the at least one interaction; the personnel member; the calling party; the organization; or a part of the organization.

19. The method of claim 1 further comprising a step of indicating the at least one current interaction to an evaluator.

20. The method of claim 1 further comprising a step of performing further analysis on the at least one total score.

21. The method of claim 1 further comprising a step of further analysis related to the at least one current interaction, or to the at least one goal.

22. The method of claim 1 wherein the at least one total score is related to the personnel member.

23. The method of claim 1 wherein the at least one total score is related to at least one product associated with the organization.

24. The method of claim 1 wherein the at least one total score is related to at least one campaign associated with the organization.

25. An apparatus for automatically evaluating an at least one current interaction between a calling party and a personnel member of an organization, based on at least one historic interaction, the apparatus comprising:
a capturing or logging component for capturing or logging the at least one historic interaction and the at least one current interaction;
a training component for receiving the at least one historic interaction to determine how to evaluate future interactions and a label associated with the at least one historic interaction, for obtaining at least one rule for determining at least one total score for the at least one historic interaction, said training comprising deducing at least one feature in association with the at least one historic interaction; and an automated quality monitoring component for obtaining at least one score for the at least one current interaction, using the at least one rule obtained by the training component, wherein the at least one value of the at least one feature is retrieved from an audio part of the at least one current interaction.

26. The apparatus of claim 25 further comprising an at least one capturing component for capturing the at least one interaction.

27. The apparatus of claim 25 further comprising an at least one capturing component for capturing additional data.

28. The apparatus of claim 25 further comprising an alert generation component for generating all alert when the at least one score exceeds a predetermined threshold.

29. The apparatus of claim 25 further comprising a storage device for storing the at least one interaction.

30. The apparatus of claim 27 further comprising a storage device for storing the additional data.

31. The apparatus of claim 25 further comprising a partial score determination component for determining according to an at least one second rule an at least one partial score for the at least one current interaction.

32. The apparatus of claim 31 further comprising an alert generation component for generating an alert when the at least one partial score exceeds a predetermined threshold.

33. A tangible computer readable storage medium containing a set of instructions for a general purpose computer, the set of instructions comprising:

receiving an at least one historic interaction and an at least one current interaction as captured by at least on capturing or logging component associated with the organization;

automatically training an automated performance evaluation system using the at least one historic interaction to determine how to evaluate future interactions and a label associated with the at least one historic interaction, for obtaining an at least one rule for determining an at least one score for the at least one historic interaction, said rule depending on an at least one feature in association with the at least one historic interaction;

automatically evaluating an at least one value of the at least one feature, in association with the at least one current interaction; and determining a score for the at least one current interaction by integrating the at least one value, using the at least one rule, wherein the at least one value of the at least one feature is retrieved from an audio part of the at least one current interaction.

34. The method of claim 1 wherein the at least one rule is deduced during the automatic training.

35. The method of claim 1 wherein the at least one rule is received during the automatic training.

36. The apparatus of claim 25 wherein the at least one rule is deduced by the training component.

37. The apparatus of claim 25 wherein the at least one rule is received by the training component.

38. The method of claim 1 further comprising the steps of:
providing feedback for the total score generated by the system; and
repeating said training utilizing said feedback.

39. The method of claim 1 wherein the at least one value of the at least one feature is retrieved from an audio part of the at least one current interaction using audio analysis.

40. The method of claim 39 wherein the audio analysis comprises at least one item selected from the group consisting of: word spotting, speech to text, emotion level analysis, burst analysis, and crosstalk duration.

41. The apparatus of claim 25 wherein the at least one value of the at least one feature is retrieved from an audio part of the at least one current interaction using audio analysis.

42. The method of claim 41 wherein the audio analysis comprises at least one item selected from the group consisting of: word spotting, speech to text, emotion level analysis, burst analysis, and crosstalk duration.

* * * * *